(12) United States Patent
Hilton

(10) Patent No.: US 6,272,222 B1
(45) Date of Patent: *Aug. 7, 2001

(54) METHOD OF AND APPARATUS FOR MANIPULATING DIGITAL DATA WORKS

(76) Inventor: David Hilton, St. George's Business Park, Alstone Lane, Cheltenham, GL51 8HF (GB)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/894,825

(22) PCT Filed: Mar. 4, 1996

(86) PCT No.: PCT/GB96/00491

§ 371 Date: Oct. 24, 1997

§ 102(e) Date: Oct. 24, 1997

(87) PCT Pub. No.: WO96/27259

PCT Pub. Date: Sep. 6, 1996

Related U.S. Application Data

(63) Continuation of application No. 08/894,825, filed on Oct. 24, 1997.

(30) Foreign Application Priority Data

Mar. 4, 1996 (GB) .................................................. 9600491

(51) Int. Cl.$^7$ ........................................................ G09C 3/00
(52) U.S. Cl. ............................ 380/54; 380/205; 713/200; 713/176; 386/95; 386/96
(58) Field of Search .................................. 380/4, 14, 59, 380/201, 202, 203, 205, 206, 207, 210, 239; 713/176, 177, 179, 165; 348/334; 386/95, 96, 104; 705/51, 57

(56) References Cited

U.S. PATENT DOCUMENTS

| | | | |
|---|---|---|---|
| 5,636,292 | * 6/1997 | Rhoads | 382/232 |
| 5,822,432 | * 10/1998 | Moskowitz et al. | 380/28 |
| 5,825,320 | * 10/1998 | Miyamori et al. | 341/139 |
| 5,848,155 | * 12/1998 | Cox | 380/4 |
| 5,875,249 | * 2/1999 | Mintzer et al. | 380/54 |

\* cited by examiner

*Primary Examiner*—Tod Swann
*Assistant Examiner*—Paul E. Callahan
(74) *Attorney, Agent, or Firm*—Woodbridge & Associates P.C.; Richard C. Woodbridge

(57) ABSTRACT

A method of hiding copyright related messages within digital data works is taught. The method relies on modifying data elements in the work according to certain rules which depend on the actual message itself. The information content of the message can be extracted through a comparison of measurable characteristics of defined portions of the modified work.

9 Claims, No Drawings

METHOD OF AND APPARATUS FOR MANIPULATING DIGITAL DATA WORKS

This application is a continuation of U.S. application Ser. No. 08/894,825, filed Oct. 24, 1997 and claims priority from International Application PCT 6B9600491 filed Mar. 4, 1996. This application is with related application Ser. No. 08/981,341, filed Feb. 6, 1998, now U.S. Pat. No. 6,115,432.

FIELD OF THE INVENTION

This invention relates to a method of and apparatus for manipulating digital data works, particularly to provide, or embed within, such digital data works, data descriptive of the work, for example, the source of the work, its ownership and its availability for legal reproduction without infringement of copyright.

DESCRIPTION OF THE PRIOR ART

Systems based upon digital data are becoming universal and indispensable; digital data passing between computers; digital telecommunications; digital audio; digital cameras; and the convergence of many of these individual components into multi-media, are a selection of the technologies to which this invention relates. The data structures or formats that are used in these different technologies are well documented and will not be described in this specification. It will however be appreciated by the skilled implementer that sophisticated encoding and compression algorithms are commonly used in digital recording and transmission and that these techniques may involve the manipulation of raw digital data in order for that data to carry further information. However, the further information introduced in such known techniques provides data needed to understand or handle, for example, bytes of the raw data properly.

The present invention is not directed to manipulating small units of digital data to enable that data to carry information inherent to the proper comprehension of the digital data itself but instead to hiding within a digital data work information that is specifically descriptive of that particular digital data work. The term digital data work defines any sequence of digital data capable of constituting a work in which copyright might subsist or the unauthorised reproduction of which might constitute infringement of any copyright subsisting in the work or a larger work of which the work itself forms a part. Hence, for example, the digital data defining the output from scanning a 35 mm colour transparency would be a digital data work.

There is a pressing need to enable the ownership of a digital data work to be readily apparent from the work itself. This would allow the owner of the copyright in the work to prove more readily its ownership and thereby prevent further unlawful reproduction or negotiate a licence fee for use of the work. Also, it would enable a publisher of digital data works, for example a company that compiles multi-media CD-ROMS, to ensure that it is not unwittingly infringing copyright. Conventionally, this requires laborious and meticulous manual recording of the provenance of third party digital data works that are to be used. This is time consuming, expensive and not wholly reliable.

As a more specific example, consider a professional photographer who uses a digital camera to take a digital photograph. He may wish to place the data file which constitutes the digital data work (the digitised photograph) with a photograph library. When the photograph is subsequently used, the photographer will be paid a copyright licence fee. However, the ease with which the data file can be duplicated without any loss of information means that the further use of the image can be impossible to control. In practice, there is a high probability that the image could be published again without the phoptographer being alerted to the fact; the photographer then losses out on licence fees. The ease with which digital images can be cropped and modified compounds the problem.

Currently, it is possible to include a simple identifier in the header of the data file of a digital data work. The header could typically comprise a simple copyright notice. However, it is very easy to strip out this information, making this approach unreliable. Further, translating a file into a different format also results in this information being lost.

Reference may also be made to Komatsu et al "A proposal on digital watermark in document image communication and its application to realising a signature": Electronics and Communications in Japan vol. 73, no.5, May 31, 1990 New York pages 22–33, XP 000159282. That paper discloses a technique for modifying images in such a way that the modified image carries hidden information. However, the modification is corrupted if the image is manipulated; like a conventional watermark, it is designed to be corrupted or absent if the image is corrupted. Hence, it is of little practical benefit since unauthorised users of images can readily destroy the coded information by performing quite ordinary image manipulations, such as cropping and small rotations (e.g. rotations of plus or minus 1 degree needed in order to accurately set the horizon in an image).

Reference may also be made to EP 0551016 to Canon K K, which discloses a system for manipulating the position of dots forming a photocopy. The relative positions of the dots code for particular information. There is no modification however of a digital data work as such.

The practical requirements for a working system capable of embedding copyright information into a digital work are demanding:

1. the system must be reasonably rapid and not memory intensive;
2. the modifications which code for the additional information must not be readily perceptible;
3. the modifications must be sufficiently robust to withstand the manipulations ordinarily applied to those data woks (e.g. in the case of digital images, cropping and small rotations as described above);
4. the modifications must not be readily detectable or removable by any unauthorised user;
5. the modifications must be reliably detectable without reference to the original data work.

These requirements are met by the present invention.

STATEMENT OF THE INVENTION

In accordance with the present invention, a method of manipulating a digital data work, made up of a number of data elements, to include additional data descriptive of that digital data work, comprises the steps of:

dividing the whole or part of the work into a pattern of constituent parts, each constituent part consisting of a set of data elements and each set of data elements having a measurable characteristic;

selecting a particular constituent part;

modifying some or all of the set of data elements of that particular constituent part according to a given set of rules such that the measurable characteristic of that set is different from the measurable characteristic of the corresponding unmodified set of data elements, or other sets in other constituent parts, wherein the difference is detectable, even after the work has undergone alternations which are of at least one kind of the alterations ordinarily applied to such works, if the pattern of the constituent parts and the nature of the measurable characteristic are known, but is not otherwise readily detectable;

and wherein the modification codes for the additional data descriptive of that digital data work.

Hence, the essence of the invention is to superimpose a selected pattern, generated by a given set of rules, on sets of data elements of the work thereby to modify the sets. The pattern may be a repeated pattern, although this is not essential. The invention can be conceptualised in terms of noise: all digital information has a noise element. This should be imperceptible. The present invention can be though of as organising this noise into regular patterns. The patterns themselves can contain information.

Where the work is an image, then the modification is, in one embodiment, superimposed on all pixels of the image, with the possible exception of those areas where such a pattern would be readily discernible to the ordinary viewer. The pattern or template may, for example, be the rows of the image and the modification may be the addition of +1 to every pixel in selected rows and the addition of −1 to every pixel in other selected rows. This modification produces only a slight change in the values describing any given pixel; however, because the pattern is applied across much or indeed preferably all of the image, the total information imparted can be considerable. The presence of the pattern can be detected by anyone who knows what pattern to look for; that user can then quantitatively determine the aggregate of all the small imposed changes if the nature of the measurable characteristic is known; statistical methods then make it possible to assess which information is significant and which may be disregarded as lying within the bounds of normal variation.

In the example above of +1 or −1 being added to pixel values, the difference between the mean value of the set of pixels which were increased by one and the mean value of the set whose values were decreased by one would be greater than a value which could be calculated as the maximum attainable from an image whose elements had not been modified in the specified manner; hence the modified image can be thought of as having been marked. Anyone who duplicates the modified image will generate an image that is marked in this way; hence, the provenance of the duplicate can be established.

The mere presence of data elements modified in this way may constitute the additional data; i.e. there is no textual information per se hidden within the digital data work.

Instead, the presence of manipulated sets of data elements acts as an indicator that the work is, for example, a copyright work which cannot be reproduced without specific permission from the right holder. This can be likened to giving the digital data work a 'fingerprint'.

Further, in another preferred embodiment, the step of modification incorporates additional data into the work which is more explicitly descriptive of the digital data work.

Typically, a copyright message or more detailed historical information broadly pertaining to the copyright in the digital data work (for example, date of creation, identity of creator etc.), can be hidden within the digital data work in a manner that is not readily detectable and therefore does not discernibly alter the digital data work. Being able to hide such data within a work clearly also has attractions to the non-commercial user as well; for example, many cameras today have the facility to imprint a date on an image. This has the disadvantage of defacing the image. With this embodiment of the present invention implemented into a digital camera, the photographer can hide not only date information but other data too (for example, the names of those photographed; the place of the photograph) into each digital image with no appreciable effect on the image itself.

Hence, in such an embodiment, the actual data content of the manipulated sets of data elements may code for particular textual information pertaining to the copyright status of the work. In this way, a copyright related code number that would be hidden to persons, for example, viewing a digitised image, can be detected if one knows the particular pattern as defined above and the nature of the measurable characteristic.

The pattern of constituent parts preferably does not form part of a continuous sequence throughout the work. In many circumstances, it may be preferable to have a permutation algorithm to generate a pattern which distributes in a complex fashion, in either time or space, the constituents parts throughout the work. This may be particularly useful where there is a need, as there will be in most applications, to conceal the required pattern in order to prevent the system being cracked. Preferably also, the modification step itself is a function of the data content of the additional textual data to be included within the work.

In a preferred embodiment, a secret key is assigned to each user. An algorithm can be derived from that key to generate a permutation. That derivation can be achieved in a number of different ways which will be apparent to the ordinary, skilled cryptographer. The permutation can be applied to the binary number sequence representing a message to be hidden into the data work: this generates a permutated pattern which contains the message, the message being readable only to one who knows the nature of the permutation, i.e. the secret key. The permutated pattern is then imposed repeatedly over the entire original data work, i.e. all pixels. The use of carefully calculated permutations resolves two otherwise conflicting demands on the organisation of the "noise" in a data work into patterns. The first demand is the need for complexity to avoid easy removal and to avoid visible artefacts on images. However, the complexity cannot be too great since that might lead to prohibitively long detection times, especially where the work is an image and the image is cropped or rotated. In the present invention, those conflicting demands are resolved by the use of a simple underlying pattern which is made substantially more complex by the use of carefully calculated permutations. These permutations both minimise the observable pattern effects and greatly simplify the search and detection process. Further, the number of permutations can be very large. For example, with a message only 10 bits long, the number of permutations is 10! (i.e., 3,268,800). Hence, there is little difficulty in providing users with unique keys.

In another embodiment, two orthogonal permutations can be applied to code for two different messages. Typically, the first message can identify a photographic agency or library and be derived using a public key. The second message, identifying the copyright owner and details of the work itself, can be derived using the secret key.

The permutated pattern may exist as a sequence in time, for example where the digital data work is an audio work. In addition, it may occur as a pattern of locations that are defined by their spatial relationships to one another. This may arise where the digital data work is an image [as in the examples given above]. The pattern may also exist as a combination of temporal and spatial sequences or patterns, for example where the digital data work is an audio-visual work, such as a television program or a film.

The data elements may be the discrete or basic units of digital information and the characteristics may be the values of those units of digital information or statistical measures related to such values. For example, where the digital data work is an audio work, the measurable characteristic may be the values of the quantised amplitude levels associated with each successive time period. If the digital data work is a digital image, then the data elements may be the pixels and the characteristics may be the pixel values, or statistical measures related to those values, as in the examples above.

More generally, the step of modifying the data elements may only occur if the original and modified data elements differ by no more than a defined tolerance. This ensures that the manipulation of the digital data work does not alter the image beyond tolerance limits, hence ensuring that the manipulation is not readily discernible. Further, the extent of the modification can be adapted to the level of noise of the work: in noisy regions in a work, larger changes are necessary, whereas in smoother regions of a work, smaller changes are required.

In a yet further aspect of the present invention, there is provided a method of reading a digital data work, made up of a number of data elements, comprising the steps of analysing the digital data work for a pre-determined pattern of constituent parts and determining if a measurable characteristic of data elements in a particular constituent part differs from that expected.

In addition, in another aspect, there is provided apparatus for manipulating a digital data work to include additional data, operable to perform the methods described above.

DETAILED DESCRIPTION

The detailed description that follows is in respect of an embodiment of the invention that relates to manipulating the digital data of a colour digital image.

The present embodiment is implemented in an apparatus, referred to as DIP (Digital Image Protection) which [1] alters digital images by selectively modifying the pixels in the image and [2] acts as a detector by scanning images for previously performed modifications. One purpose of DIP is to hide (i.e. "fingerprint") text information in the image in such a way that the legal owner of the copyright in the image can prove his/her ownership of the image even after severe modifications of the image.

Each time the user runs the program to place such hidden information within an image, a counter in DIP is incremented by one; when a pre-set number of runs have been made, no further runs are possible until the user has obtained a re-fresh. The counter may be incorporated within a "dongle", conventionally used to prevent copying of software programs and used also as an access control device. The re-fresh may be achieved by the user purchasing a new "dongle". Alternatively, the counter may be linked to an encryption program that enables further usage when a given code word is entered via a connected keyboard into the DIP apparatus. That code word is unique to that particular DIP and/or connected "dongle" and can be obtained by the user telephoning its DIP supplier, who will have recorded the various codes. In this way, the DIP supplier ensures continuing revenues on a usage basis.

The permutation process is fundamental to one embodiment of the invention, namely the embodiment that enables messages to be coded into digital data works. A simple exemplification of the development of the permutation method now follows. The generalised version of this method, initially in a slightly simplified form, is then presented in mathematical notation. The conceptual basis for the permutation technique is detailed below.

A SIMPLE CODE SEQUENCE WITH NO PERMUTATIONS

Suppose a code is to be added to an original image which is 60 ×60 pixels in size and that code is in the form of six numbers a, b, c, d, e, f, all of which fall within the range −2 to +2. This code could be added to groups of six adjacent pixels, so that the code formed the sequence adcdefabcdefabcdef . . . .

However, this sequence is so regular it might readily be seen by the human eye. Also, the code is so obvious it is readily detectable by a hacker. Nevertheless, continuing with this example for illustrative convenience, imagine that the original pixel values of the image are:

34 49 38 41 77 70 68 63 ( . . . up to the 60th column)

( . . . for all rows up to the 60th row)

then the coded image will have the values:

34+$a$ 49+$b$ 38+$c$ 41+$d$ 77+$e$ 70+$f$ 68+$a$ 63+$b$ ( . . . up to the 60th column)

( . . . for all rows up to the 60th row)

We can then define a set of all those pixels that have had a added to them as the set A; and all those that have had b added to them as the set B, and similarly for sets C,D,E and F.

Suppose the mean pixel value for the whole image before the coding is applied is 100. Because the numbers of elements in each of the sets A, B, C, D, E and F are large, the mean value of each set will be quite close to 100 also. For example, the means values might be:

100.3 99.6 100.1 100.2 99.9 99.8 respectively

Suppose that we set the values for a, b, c, d, e, f as follows:

2 −1 1 1 −2 −1

Then the mean values for each set are:

102.3 98.6 101.1 101.2 97.9 98.8

If we round the numbers to the nearest whole number, we obtain:

102 99 101 102 98 99

If we subtract 100 from each of these, we find the original code:

2 −1 1 2 −2 −1

This simple example illustrates how the coded message can be input and recovered. Statistical test can also be used to determine if a code is present. Statistical tests are always needed because the limits of possible deviations of the mean value of sets A,B, . . . , must be calculated in order to be sure that results are not caused by random fluctuations.

PERMUTATION METHODS

The code abcdefabcdefabcdef . . . is so regular it might readily be seen by the human eye. Also, the code is so obvious it is readily detectable by a hacker. The permutation technique effectively addresses both concerns.

A permutation is simply a re-ordering of numbers. Using a standard notation, we can represent the straight forward order abcdef with the code P0. We can permute this sequence so that the first element is shifted to the third, the second to the sixth, the third to the fifth, the fourth to the first, the fifth to the second and the sixth to the fourth. We can represent this with the simple notation.

$$P = \begin{matrix} 1 & 2 & 3 & 4 & 5 & 6 \\ 3 & 6 & 5 & 1 & 2 & 4 \end{matrix}$$

so that P1{a,b,c,d,e,f}={d,e,a,f,c,b}

We can now apply the same permutation to the new set so that

P2{a,b,c,d,e,f}=P{d,e,a,f,c,b}=P(P{a,b,c,d,e,f})={f,e,d,b,a,e}

This yields the following six permutations:

P0={a,b,c,d,e,f}
P1={d,e,a,f,c,b}
P2={f,c,d,b,a,e}
P3={b,a,f,e,d,c}
P4={e,d,b,c,f,a}
P5={c,f,e,a,b,d}
P6={a,b,c,d,e,f}=P0

In the first example above, the code was added in the simplest possible, i.e.

abcdefabcdefabcdef . . .

The permutation technique allows us to add the following sequence instead:

abcdef deafcb fcdbae bafedc edbcfa cfeabd . . .

This sequence is both far less noticeable and also less corruptible. Since the detector knows the permutation to look for, it will be able to reconstruct the sets A, B, C, D, E, F.

The commutative permutation technique is a versatile one and leads to images carrying the code being able to retain sufficient code information even after manipulations to the image such as cropping. For example, before the image has been cropped, suppose that the first pixel had the value a added to it. After cropping, we do not know which part of the sequence starts at the first pixel. In the example given above, there are 6 sets of 6 elements each, i.e. 36 elements in total. However, the detector does not have to try each of the 36 elements as possible start elements. In fact, it need look only at the first 6 elements. In practice, there is an even greater saving, since instead of there being 6 sets of 6 elements each, there are typically 30 sets of 30 elements each.

Suppose that the image has been cropped so that the pattern added to it is as follows:

fcb fcdbae bafedc edbcfa cfeadb abcdef deafcb fedbae bafedc . . .

The detector will not know that the image has been cropped and will therefore assume that the first 6 elements form the first set. It will see the above sequence as:

fcbfcd baebaf edcedb cfacfe adbabe defdea fcbfed baebaf edc . . .

If the sequence fcbfcd was genuinely the first set, then the next set ought to be fcfdbe, since that is the first permutation of it. But in fact the next set is baebaf. Because of this mismatch, the detector knows that the sequence does not in fact start at febfed, i.e. the detector knows that the image must have been cropped. If it then moves on to the next letter, the first e, the same problem arises. The same problem also arises with the next letter, b. However, on moving to the next element, the fourth, i.e. the second letter f, the predicted subsequent permutations in fact agree with those actually present in the image. Hence the detector can rapidly determine where the true start of the sequence is by looking only at the first six elements, even though the image has been cropped.

Because the same permutation is applied to convert each of the sets P0, P1, P2, P3, P4, P5 into each of the others, the detector still does not know whether the set fcdbae is P2 or one of the other sets. This can however be solved by saying that the element a always has a particular value (2 in the example above) and that no other element has that value. Once the set fcdbae has been found, the unique value a will be found in the fifth location. This therefore shows that the set is P2. Having defined P2, all the other sets can be defined in the right order.

APPLYING THE PERMUTATION TO A REAL IMAGE

To make the pattern more compact and also to go further in avoiding artefacts produced by the fingerprint, it is formed in rectangular rather than linear arrays. The permutations defined above will actually be imprinted as:

```
abc  baf  abc  baf  abc  baf  ...
def  dec  def  dec  def  dec  ...

fed  cfe  fed  cfe  fed  cfe  ...
bae  abd  bae  abd  bae  abd  ...

edb  dea  edb  dea  edb  dea  ...
cfa  fcb  cfa  fcb  cfa  fcb  ...

abc  baf  abc  baf  abc  baf  ...
def  dec  def  dec  def  dec  ...
```

This can be represented as follows:

```
P0  P3  P0  P3  P0  P3
P2  P5  P2  P5  P0  P5
P4  P1  P4  P1  P4  P1
P0  P3  P0  P3  P0  P3
P2  P5  P2  P5  P0  P5
P4  P1  P4  P1  P4  P1
```

The detection operates as described above, with for example, the same process being applied to detect cropping. It should be noted that as readily available computing power increases, the detector can use more sophisticated means of detection and can thus cope with greater levels of image degradation and more elaborate transformations in a reasonable time.

In the example above, a code with only 6 elements was discussed. Suppose we need to deal with a code with many more elements. We would like to arrange them in the rectangular array described above and avoid too much regularity. We are therefore interested in any number n which is a product of a pair of co-primes, r and s (in the example above, n is 6, the product of the co-prime pair 2 and 3). The number of permutations is very large so that it is difficult to extract the message without a knowledge of the key and the extraction method.

GENERALISATION OF THE PERMUTATION METHOD

The generalisation of the above example will now be described, initially in a slightly simplified form. This generalisation describes a linear permutation scheme in which there are offsets applied to each image line. Some of the general concepts put forward above are repeated, but in a slightly different (and in parts more mathematical) manner.

In this example, the pattern which DIP imposes upon such an image may be regarded as a template covering a set of pixels; the template is repeatedly placed upon the image. Any chosen element of the template will appear in many positions on the image. Corresponding to any element of the template is a set of pixels, each corresponding to an element of the template. If the shape and size of the template are appropriately chosen then the sets into which the image is divided will be tightly interlaced. This will mean that the average values of pixels in one set should not differ substantially from the average values in another set. If, however, a value is added to every member of one of these sets then the average value will show a marked deviation from that of any other set. This difference constitutes a recoverable piece of information.

In more mathematical terms, the average values of the sets of values into which the image is sub-divided will have a known statistical distribution. The parameters of this distribution can easily be calculated in advance. This enables any exceptional values such as those arising from imposition of a regular pattern to be detected. It is also possible to calculate the relationship between the number of elements in a pattern, the magnitude of the imposed alteration in data, the size of the image and the detectability of a pattern. Thus the type of pattern appropriate for any given situation can be selected.

As in the previous examples, the imposed pattern provides a means of storing a message of some sort in an image. The length of that message is restricted by the consideration above, namely the need not to subdivide the image into sets of too small a size. However, too short a repeated pattern would ease the problem of detection for someone who did not have the encryption key used in the original marking process (see below). For this reason, the pattern is again permutated throughout the image according to a rule derived from the encryption key.

In one embodiment, the user selects an alphanumeric encryption key $K\{k_1, k_2, \ldots k_n\}$ and message $M\{m_1, m_2, \ldots m_p\}$. The number, p, of terms in the message is governed by the minimum size of an image in which the fingerprint may be detected.

Encryption process E converts K into a set of q-1 permutations $P\{1, p2, \ldots pq-1\}$ and a set of integer offsets $()\{off_1, off_2, \ldots off_s\}$, and also converts M into a set of integers $N\{n_1, n_2, \ldots n_r\}$, some positive and some negative.

A set of q permutations of N are then generated according to the scheme:

$^N1 = p1\ (N)$
$^N2 = p2\ (^N1)$
$^N3 = p2\ (^N2)$ i.e.: $N_{q-1} = P_{q-1}(N_{(q-2)})$ $N, N_1, N_2, \ldots N_{q-1}$ are then concatenated to produce a single extended set $EN\{en_1, en_2, \ldots en_{qr}\}$.

The values in EN are then added in succession to the values describing the pixels along a line of the image. The same values are then added to the succeeding line with an offset chosen successively from the set ().

Schematically, this can be represented as:

```
for(row = 0; row < imageheight; row ++)
{
    row_offset = off (row % s) (a % b = remainder when a is divided by b)
    for (pixel = 0; pixel < imagewidth; pixel ++)
    {
        pixel_offset = (row_offset + pixel) % qr;
        pattern_value = en(pixel % qr);
        pixel_value = pixel_value + pattern_value;
    }
}
```

The fingerprint thus exists throughout the image and hence operations such as cropping, rotating and scaling will not affect its presence. The addition of patterns, excepting those of identical frequencies, will not disguise the fingerprint. Knowledge of the required destructive frequencies requires knowledge of the encryption process E.

The method DIP uses to detect the presence of fingerprints will now be described. Detection requires knowledge of the encryption key K. As above, the set of permutations P and offsets () are generated from this key K. The detector then calculates a set of equivalent pixels for the image as follows: The set $S\{1,2,3 \ldots p\}$ is permuted according to the scheme:

$^S1 = p1\ (S)$
$^S2 = p2\ (^S1)$
$^S3 = p3\ (^S2)$ i.e.: $^Sq = 1 = pg - 1^{(S}(q-2)^)$ $S, S_1, S_2, \ldots S_{q-1}$ are then concatenated to produce a single extended set $ES\{es_1, es_2, \ldots es_{n\ q}\}$, where each of the elements es is an integer in the range 1 to p.

This set of values is attached one to each pixel across a line of the image. The detector takes the first line of the image and ascribes each pixel value to one of p equivalent sets $Q\{q1, q2, q3 \ldots q_p\}$ as indicated below. The total value, $T_q$, of the pixels i each set is then found.

Schematically:

```
for(row = 0; row < imageheight; row ++)
{
    row_offset = off (row % s)
    for (pixel = 0; pixel < imagewidth; pixel ++)
    {
        pixel_offset = (row_offset + pixel) % qr;
        equiv_set = espixel_offset;
        Tequiv_set = Tequiv_set + pixel_value;
    }
}
```

This summation produces a set of p totals $T_q$. By applying a Chi squared test it can be determined whether or not these totals could have arisen from data which had not been modified according to the selected form of encryption. This test may thus confirm the existence of a message coded by the use of key K. If the message is thus found to exist it may be deciphered as follows. The mean value $T_{mean}$ of the set of total $T_q$ is found. The standard deviation of the totals is calculated from knowledge of the standard deviation of the original data and the number of pixel values in the image. From this an upper limit U and lower limit L of expected value of $T_q$ are calculated. Only if a pattern has been imposed on the image will values of $T_q$ lie outside the range (L,U).

The message is deciphered in binary form using the rule for each total in turn:

```
for(index = 0; index < p; index ++)
{
    if(T index > U)
    {
        mindex = +1;
    }
    else
    {
        If(Tindex < L)
        {
            mindex = -1;
        }
        else
        {   mindex is not defined
        }
    }
}
```

If all values of m are defined then the message is valid.

Transformations of an image mean that the above method must be applied with different orientations, starting locations and scaling factors. However, the nature of the method will remain substantially unchanged.

To render the above scheme equivalent to the original simple example, and for the reasons elucidated in that example, each of the permuted sets $N^1$, $N^2$, $N^3$, . . . , is arranged in a rectangle rather than in linear fashion. These rectangles are then arranged in a fashion analagous to that described in the example.

ORIENTATION MARKERS

One of the problems of precisely defined patterns being imposed on an image is that resizing or rotation of the image renders the detection very difficult and in general requires that repeated searches with different values of three parameters be performed. To overcome this problem, the image can be printed with orientation markers. These markers are in the form of stripes at a chosen angle. To avoid being clearly visible the stripes are not solid. Instead, pixels forming part of the stripes are turned on randomly. This leads to the stripe image not being trivially removable.

The method of detection of the stripes is to search the image for regularly occurring frequencies which correspond to the width of the stripes. The image is then rotated through small amounts and in each position the presence of a dominating frequency is sought. The angle at which such a frequency occurs indicates the angle of rotation, the value of the frequency indicates the scaling of the image if the frequency of the original is known.

Alternatively, dominating frequencies may be sought in two orthogonal directions and the same information derived together with information about any anamorphism. The frequency can be sought by the usual method of correlating the image with a function of known frequency, or by correlating two or more separate parts of the image.

What is claimed is:

1. A method of reading a digital data work, organized into a spatial or temporal pattern of constituent parts, each such part made up of a set of data elements, comprising the steps of:

analyzing the digital data work for a spatial or temporal pattern of constituent parts;

determining if a measurable characteristic of the set of data elements forming a particular constituent part differs from that expected, the difference (i) arising from a modification deliberately applied to the digital data work to code for additional data descriptive of the digital data work, and (ii) being detectable, even after an original of the digital data work has undergone alterations to generate the digital data work, which are of at least one of the kinds of alterations ordinarily applied to such works, said alterations including cropping or scaling, if the spatial or temporal pattern of the constituent parts in the digital data work is known and the nature of the measurable characteristic is known, but is not otherwise readily detectable; and, analyzing the values of the measurable characteristics of some or all of the constituent parts in order to recover the additional data.

2. The method of claim 1 wherein the step of analyzing the values of the measurable characteristics to recover the additional data uses a statistical technique.

3. The method of claim 1 wherein a pattern is generated which distributes, in either time or space, the constituent parts throughout the work.

4. The method of claim 1 further comprising the steps of:

providing an apparatus adapted to read a digital data work to determine if that digital data work includes additional data descriptive of that digital data work, the work being (i) made up of a number of data elements, and (ii) divided into a spatial or temporal pattern of constituent parts, each constituent part consisting of a set of data elements and each set of data elements having a measurable characteristic; and, providing a processor programmed to perform the method of reading a digital data work.

5. The method of claim 4 in which a pattern is generated, which distributes, in either time or space, the constituent parts throughout the work and the processor is programmed to locate the first data element.

6. A computer program operable to read a digital data work using the method defined in claim 1.

7. The method of claim 4 wherein the additional data descriptive of that digital data work is information relating to copyright in the digital data work.

8. A method of manipulating a digital data work, made up of a number of data elements, to include additional data descriptive of that digital data work, comprising the steps of:

dividing the whole or part of the work into a spatial or temporal pattern of constituent parts, each constituent part consisting of a set of data elements and each set of data elements having a measurable characteristic;

selecting a particular constituent part;

modifying some or all of the set of data elements of that particular constituent part according to a given set of rules such that the measurable characteristic of that set is different from the measurable characteristic of the corresponding unmodified set of data elements, or other sets in other constituent parts, said modifing step including using a permutation algorithm to generate a pattern which distributes, in either time or space, the constituent parts throughout the work, and wherein said permutated pattern is imposed as a rectangular array;

wherein the difference is detectable, even after the work has undergone alterations which are of at least one kind of the alterations ordinarily applied to such works said alterations including cropping or scaling, if the spatial or temporal pattern of the constituent parts and the nature of the measurable characteristic are known, but is not otherwise readily detectable;

and wherein the modification codes for the additional data descriptive of that digital data work and wherein said additional data descriptive of that digital data work consists of two messages, one associated with a first permutation, the second associated with a second permutation, the permutations being orthogonal.

9. A digital media pre-recorded with a computer program and operable to manipulate a digital data work, made up of a number of data elements, to include additional data descriptive of that digital data work, comprising the steps of:

dividing the whole or part of the work into a spatial or temporal pattern of constituent parts, each constituent part consisting of a set of data elements and each set of data elements having a measurable characteristic;

selecting a particular constituent part;

modifying some or all of the set of data elements of that particular constituent part according to a given set of rules such that the measurable characteristic of that set is different from the measurable characteristic of the corresponding unmodified set of data elemetns, or other sets in other constituent parts, wherein the difference is detectable, even after the work has undergone alterations which are of at least one kind of the alterations ordinarily applied to such works, such alterations including cropping or scaling, if the spatial or temporal pattern of the constituent parts and the nature of the measurable characteristic are known, but is not otherwise readily detectable;

and wherein the modification codes for the additional data descriptive of that digital data work.

* * * * *